March 26, 1957 E. W. BRUNS 2,786,527
APPARATUS FOR SLITTING AND COILING LINES
Filed July 21, 1954 2 Sheets-Sheet 1
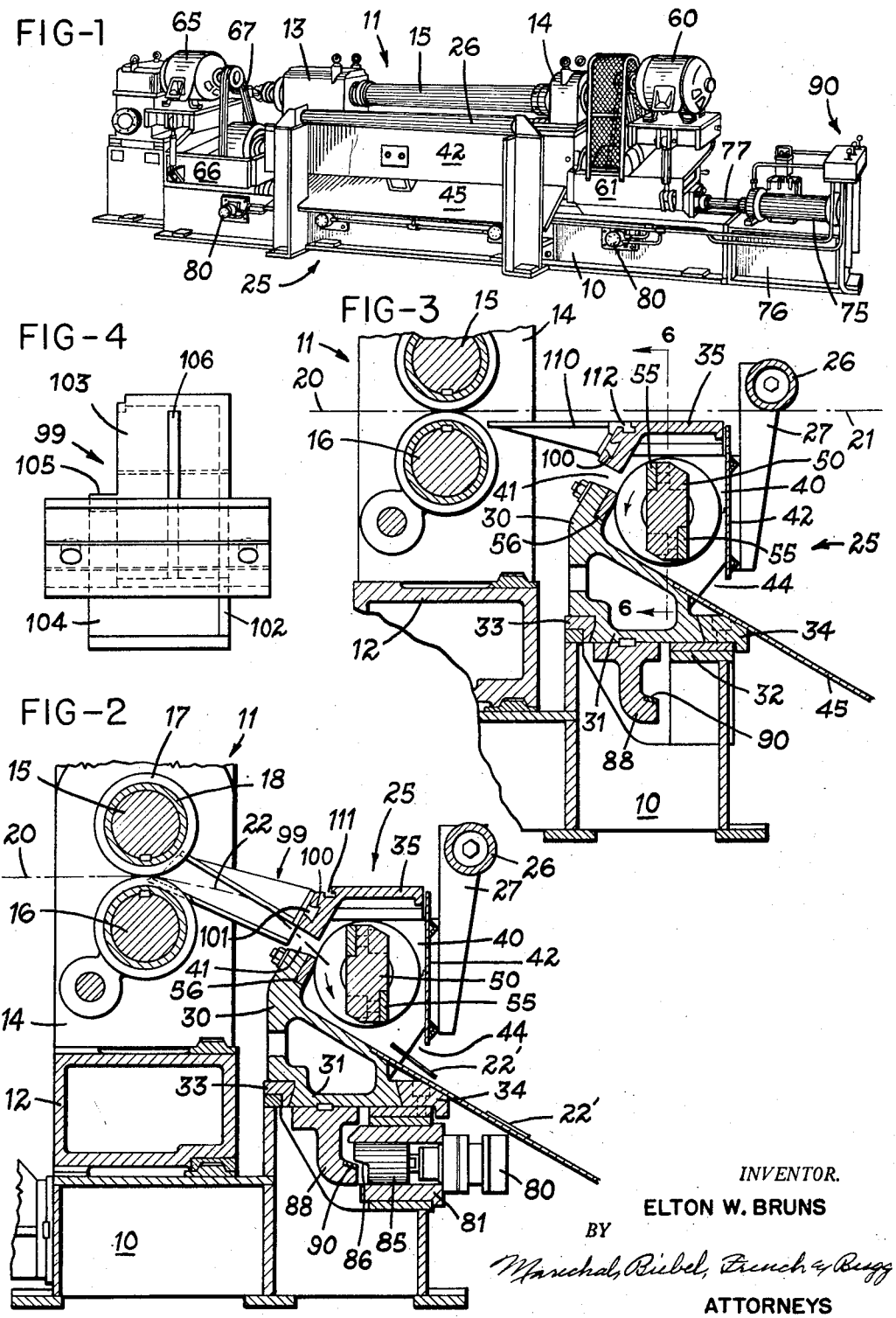
INVENTOR.
ELTON W. BRUNS
BY
Marechal, Biebel, French & Bugg
ATTORNEYS

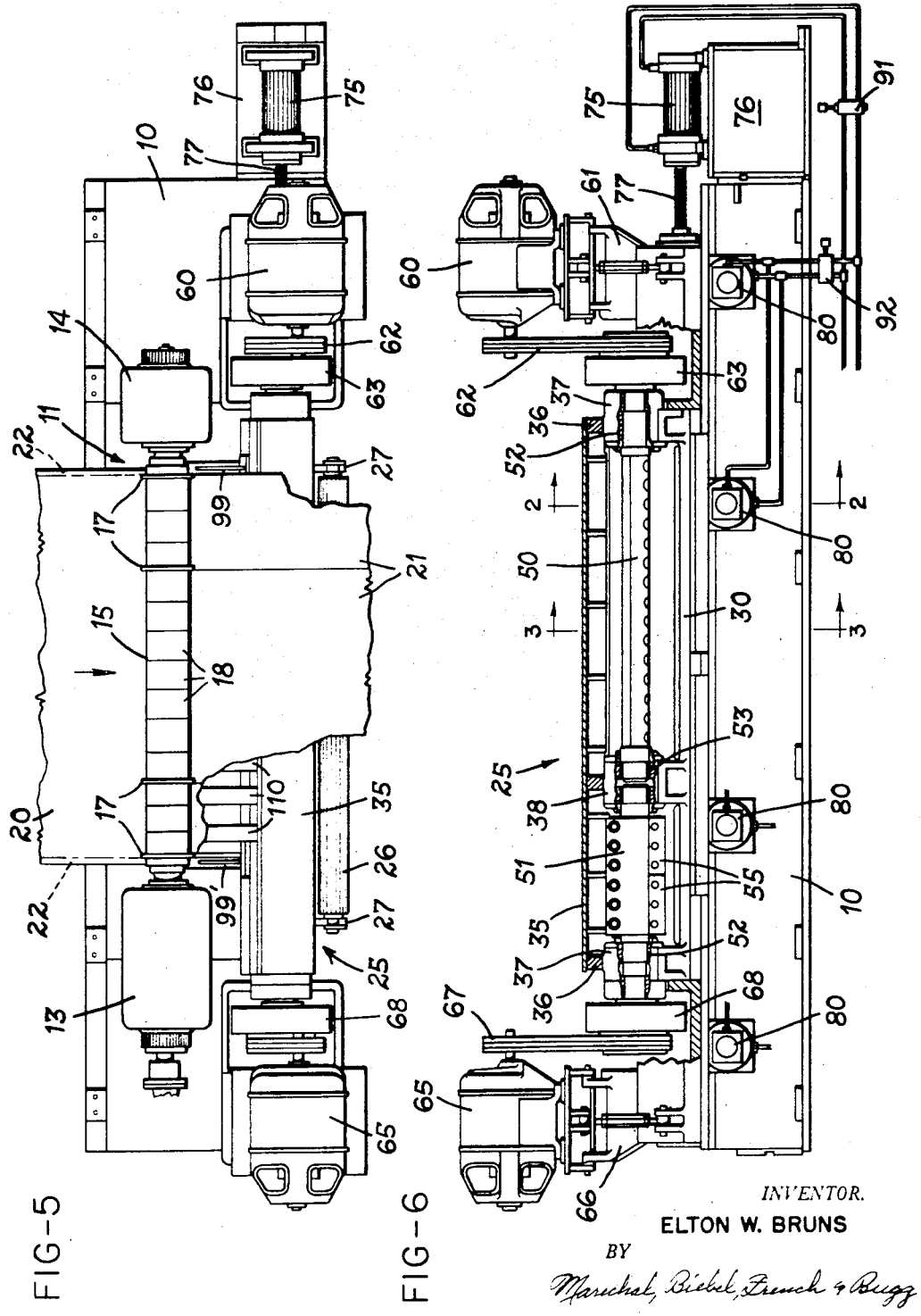

United States Patent Office 2,786,527
Patented Mar. 26, 1957

2,786,527
APPARATUS FOR SLITTING AND COILING LINES

Elton W. Bruns, New Bremen, Ohio, assignor to Stamco, Inc., New Bremen, Ohio, a corporation of Ohio Application July 21, 1954, Serial No. 444,776

5 Claims. (Cl. 164—10.6)

This invention relates to apparatus for use in the slitting of sheet materials and particularly sheet metals.

The invention has special application to slitting and coiling lines for handling sheet metal at high speed to unwind a wide band of coil stock, slit the wide web into two or more narrower bands, and then to recoil the resulting plurality of bands or to shear them into shorter lengths. In such fabricating operations on sheet or coil stock, it is commonly necessary to trim the side edges of the stock in order to assure straight edges for all the bands or strips, and this is readily done as part of the general slitting operation. The resulting strips trimmed from the side edges of the wide web are usually of nonuniform width and hence constitute scrap requiring disposal.

If these scrap strips are cut into short lengths, they are more readily and economically handled for subsequent disposal, and such scrap cutting operation is preferably performed close to the slitting station in order to minimize the necessity for other treatment of the scrap in band form. For example, a revolving cutter may be positioned to receive the scrap strips as they are trimmed from the sheet, with this cutter being rotated at a rate such that the scrap strips are cut into convenient short lengths of a few inches. Such operation, however, imposes severe wear conditions on the cutter, which is likely to require removal or replacement considerably more frequently than the slitting knives or other parts in the slitting line, with resulting unproductive time for the other relatively expensive equipment in the line during maintenance of the scrap cutter.

It is a primary object of the present invention to provide a scrap cutter for use as outlined above in a slitting line for sheet or coil stock wherein the cutting parts are quickly and easily renewable without removing any part of the apparatus from the line and thus with minimum interruption of the production of the line as a whole.

Another object is to provide a scrap cutter as outlined above wherein the cutting unit, including a rotary cutter and drive therefor, is mounted for movement transversely of the slitting line on a base which is fixed with respect to the line and wherein the cutting parts are considerably longer than the width of each scrap strip to be cut thereby so that fresh cutting edges can be presented to the scrap strips by simple adjustment of the cutting unit with respect to the slitting line.

It is also an object of the invention to provide an adjustable scrap cutter for sheet or coil stock which incorporates provision for firmly securing the cutting unit with respect to the fixed base of the slitter during operation for maximum absorption of vibration arising from the periodic nature of the cutting operation, and particularly to provide such a scrap cutter wherein the parts which secure the cutting unit to the base are quickly and easily releasable to accelerate the adjusting operation for removal of the cutter.

Additional objects and advantages of the invention will be apparent from the following description, the accompanying drawings and the appended claims.

In the drawings—

Fig. 1 is a perspective view of a slitting unit for sheet stock incorporating an adjustable scrap cutter in accordance with the present invention;

Fig. 2 is a section through the scrap cutter of Fig. 1, the view being taken approximately on the line 2—2 of Fig. 6;

Fig. 3 is a section on the line 3—3 of Fig. 6;

Fig. 4 is a detail view of one of the members for guiding the scrap into the scrap cutter and looking from right to left in Fig. 2;

Fig. 5 is a somewhat diagrammatic top view of the scrap cutter of Fig. 1; and

Fig. 6 is a view partly in front elevation and partly in axial section on the line 6—6 of Fig. 3.

Referring to the drawings, which illustrate a preferred embodiment of the invention, Figs. 1 and 2 show a slitter and scrap cutting assembly which includes a fixed main base 10 supporting a slitter head indicated generally at 11. This slitter head includes a sub base 12 on which are mounted supporting housings 13 and 14 for a pair of slitting arbors 15 and 16 which in turn carry the usual slitting disk knives 17 and spacer collars 18. The slitter head 11 is shown as of the quickly removable and replaceable type disclosed in detail in my copending application Serial No. 437,547 filed June 17, 1954, and assigned to the same assignee as this application.

The slitter head 11 slits the entering web 20 of sheet stock into the desired number of strips 21 for further use, and the end knives 17 trim the side edges of the web into strips 22 of scrap. The main base 10 accordingly also supports a scrap cutting unit indicated generally at 25, and the good strips 21 are guided across the top of this scrap cutter by way of the exit idler 26 on brackets 27 while the scrap strips 22 are guided into the scrap cutter 25 for cutting into short lengths 22' for ready disposal. The present invention is especially directed to providing for quick and easy renewal of the means within the scrap cutter 25 for cutting up these scrap strips.

The main frame 30 of the scrap cutter includes a dovetail lower portion 31 which is supported for sliding movement lengthwise of the main base 10 by means of rails or plates 32 and 33 secured on the base and a retaining and guiding gib 34 bolted to the plate 32. The top of this main frame is formed by a cover plate 35 which includes supporting portions 36 bolted to the bearing caps 37 and 38, and the cover plate 35 overhangs the main frame 30 to form therewith a space 40 within which the actual cutting of the scrap is carried out, and a slot 41 is provided between frame 30 and cover 35 for entry of the scrap strips 22 to this space 40. A scrap deflecting plate 42 is mounted on the cover 35 to close the front of the space 40 except for an exit slot 44 for the cut pieces of scrap. A guide plate 45 is mounted on the frame 30 below this slot 44 to guide the cut pieces 22' of scrap from the space 40 toward the floor in front of the apparatus.

Within the space 40 are the scrap cutting parts, which are shown as including a pair of rotating knife holders 50 and 51 which are essentially shafts or arbors journaled in end bearings 52 and a center bearing 53 carried by the frame 30. Each of these knife holders includes flat portions to which are bolted a plurality of removable knives 55, and an additional set of these knives 56 is bolted to the inner edge of the frame 30 just below the entry slot 41 for cooperation with the knives 55 as the knife holder rotates.

It is a common practice in slitting operations to utilize one edge of the sheet 20 as a fixed or index edge from which measurements are made across the sheet for the several bands into which the sheet is to be slit, and this indexing edge is shown in the drawings as the right hand edge as viewed in the direction of travel of the sheet through the slitter. The scrap strip 22 at this edge of the sheet is accordingly cut by the knives 55 on the right hand knife holder 51, but since the stock sheet 20 may be of any of a considerable range of initial widths, the left hand knife holder 50 is shown as of substantially greater length to handle the other scrap strip 22 at a corresponding variety of distances from the index edge of the sheet, satisfactory results having been obtained with these knife holders respectively 24 inches and 60 inches in length for a scrap cutter employed with a slitter having a maximum cutting width of 75 inches.

Each of these knife holders is provided with a separate drive which is mounted on the base 10 for movement laterally of the base with the main scrap cutter frame 30. The drive motor 60 for the knife holder 50 is carried by a bracket 61 bolted or otherwise secured to the adjacent end of the frame 30, and this motor drives knife holder 50 through belts 62 and a flywheel 63 on the knife holder. The drive motor 65 for the other knife holder 51 is similarly carried by a bracket 66 secured to the right hand end of the frame 30, and this motor drives knife holder 51 through belts 67 and a flywheel 68. It will be apparent that it is not essential to provide separate knife holders and drives, and satisfactory results have been obtained with the scrap cutter of the invention constructed with a single knife holder and drive motor corresponding to the parts 50 and 60, in which event the center bearing and right hand drive are eliminated and the single knife holder is journaled only in the illustrated end bearings.

Provision is made in accordance with the invention both for shifting the entire frame 30 and the parts supported thereby lengthwise of the main slitter base 10 and also for rapidly securing these shiftable parts to the base 10 during operation. Movement of the scrap cutter is effected by a two-way hydraulic cylinder 75 which is mounted on the main base 10 or an auxiliary base 76 rigidly secured thereto and thus in effect forming part of the main base. The piston rod 77 of cylinder 75 is connected to the motor bracket 61 so that application of pressure in either end of the cylinder will cause corresponding movement of the piston rod and hence of the entire scrap cutter assembly along the main base 10. Since these parts together have substantial weight and mass, this cylinder 75 should be relatively powerful, satisfactory results having been obtained with such cylinder having a 6-inch bore and a 12-inch stroke.

The locking means for the scrap cutter include a plurality of two-way hydraulic cylinders 80 mounted along the front of the main base 10. Each of these cylinders 80 is mounted in the front wall of the base by means of a clamp plunger cartridge 81, and the piston rod for each cylinder 80 operates a clamp lug plunger 85 reciprocable in its associated cartridge 81 and having a beveled overhanging surface 86 at its inner end. The clamp lug plungers 85 cooperate with an extended clamp lug 88 bolted to the underside of the frame portion 31 and depending therefrom within the base 10, the lug 88 having a beveled upwardly facing surface complementary to the beveled surface 86 and provided with a liner strip 90 of material suitably resistant to galling such as brass or bronze.

It will accordingly be seen that when hydraulic pressure is applied in the outer ends of the cylinders 80, the plungers 85 will be moved to positions of frictional locking engagement of their beveled surfaces 86 with the liner strip 90 on the clamp lug 88 to establish a firm locking relation of the scrap cutter to the main base 10, and this is desirable in operation particularly because of the vibrational effects arising from the periodic nature of the cutting operation on the scrap as the knife holders rotate. Conversely, when pressure is applied at the inner ends of the cylinders 80, the clamp lug plungers 85 will be retracted out of locking engagement with the lug 88, and the entire scrap cutting unit will then be free for movement along the base 10 in accordance with the application of hydraulic pressure in the cylinder 75. The movements of the plungers 85 are therefore relatively short, but since it is desirable to establish both strong locking conditions and also readily releasable conditions, the cylinders 80 are preferably of comparatively large bore but short stroke, and satisfactory results have been obtained with these cylinders 80 having a 5-inch bore and a 1-inch stroke.

The hydraulic circuits for cylinders 75 and 80 are indicated in Fig. 1 as including valves grouped at a convenient operating station 90, and these valves are shown in Fig. 6 as manually operated valves 91 and 92 each having a neutral position and two operating positions for supplying hydraulic pressure selectively to either end of the associated cylinder or cylinders. It will be apparent that any suitable similar hydraulic system may be utilized as desired.

Special means are provided for guiding the good strips 21 and scrap strips 22 respectively across and into the scrap cutters, and particularly for quickly and easily shifting such guide means in accordance with the moved position of the frame 30. The left hand scrap guide 99 is mounted on the cover 35 by means of a dovetailed groove 100 in cover 35 which receives wedge nuts 101 bolted to the base end of the scrap guide by suitable bolts in the bolt holes shown at opposite sides of the scrap guide in Fig. 4. As shown in Fig. 4, the scrap guide 99 includes a side wall 102 cooperating with upper and lower walls 103 and 104 to form a laterally opening channel which receives the scrap strip 22 from the slitter and guides it into the slot 41. The upper wall 103 is cut back at 105 at its outer end for proper fit with the upper knife 17, and the part 106 of scrap guide 99 is a stiffening rib.

The right hand scrap guide 99' is of essentially the same construction except that it forms a laterally opening channel facing the channel portion of the left hand scrap guide. In operation, these scrap guides are initially established in proper alignment with the trimming knives on the slitter, namely the outermost knives 17, and are locked in position by tightening the nuts 101. Then whenever the scrap cutter is shifted to present a fresh cutting edge to the scrap, the scrap guides are quickly and easily adjusted to proper alignment with the end slitting knives on the slitter head by temporarily loosening and sliding the nuts 101 in the dovetailed groove 100.

There are a plurality of guide fingers 110 of generally T-shaped section for supporting and guiding the good strips 21 of stock from the slitter head to the top of cover 35, and these guide fingers are also quickly and easily adjustable in accordance with the movement position of the scrap cutter. The cover 35 is provided in its upper surface with an undercut groove 111, and each of the guide fingers 110 includes a bracket portion 112 receivable in this groove in interfitting relation with the undercut portion of the groove as shown. Mounting and adjustment of these guide fingers accordingly simply requires insertion of these bracket portions into the groove 111 and downward movement of the fingers to their rest position shown in Fig. 3. It will be apparent that with these fingers of relatively narrow width such as two to three inches, the necessary plurality of fingers can be used in accordance with the number and width of the bands into which the main sheet is slit, and they are quickly and easily shiftable into proper alignment with the slit bands whenever the scrap cutter unit is moved to a new position. It should also be noted that the functions of these fingers are of most importance during threading of a new sheet through the slitting station, since if the sheet is pulled through the slitter by the drive at the rewind station (not shown) in accordance with the conventional practice, this tension will normally maintain the sheet above the fingers as shown in Fig. 3.

It will accordingly be seen that this invention provides a scrap cutting unit having major practical advantages for use in slitting lines as described. In particular, since each scrap strip of stock is normally of relatively narrow width, then with the parts of the proportions indicated above, the cutting edges which actually engage the scrap strips can be renewed a plurality of times without appreciably interrupting the slitting line, since the renewing operation requires only release of the locking cylinders 80, momentary actuating of the main cylinders 75, and relocking of the locking cylinders. In fact, such operation can be carried out in a fraction of the time necessary to thread a new coil of stock into the slitter head so that no working time is lost by reason of renewal of the scrap cutter knives. Obviously, the individual knives 55 and 56 do require replacement from time to time, but this will be at very much more widely spaced intervals than for installations wherein there is no provision for renewal of the scrap cutting parts except by physical replacement thereof.

While the forms of apparatus herein described constitute preferred embodiment of the invention, it is to be understood that the invention is not limited to these precise forms of apparatus, and that changes may be made therein without departing from the scope of the invention which is defined in the appended claims.

What is claimed is:

1. An adjustable scrap cutter for use in a slitting line for sheet stock including a main base and slitting means for continuously trimming scrap strips from the side edges of the stock, comprising a frame, means supporting said frame in movable relation with said base transversely of said line, rotary means carried by said frame for cutting said scrap strips into relatively short pieces, means for guiding said scrap strips to said cutting means, said cutting means including a pair of complementary shearing blades having cutting edges extending transversely of said slitting line at all times and being of substantially greater effective length than the widths of said scrap strips to provide for cutting said scrap strips at a multiplicity of positions along said cutting means, means under the control of the operator for moving said frame with respect to said base to change the location along said cutting means at which said scrap strips are cut, and releasable means under the control of the operator for locking said frame in rigid relation with said main base.

2. An adjustable scrap cutter for use in a slitting line for sheet stock including a main base and slitting means for continuously trimming scrap strips from the side edges of the stock, comprising a frame, means supporting said frame in movable relation with said base transversely of said line, rotary means carried by said frame for cutting said scrap strips into relatively short pieces, means for guiding said scrap strips to said cutting means, said cutting means including a pair of complementary shearing blades having cutting edges extending transversely of said slitting line at all times and being of substantially greater effective length than the widths of said scrap strips to provide for cutting said scrap strips at a multiplicity of positions along said cutting means, means under the control of the operator for moving said frame with respect to said base to change the location along said cutting means at which said scrap strips are cut, releasable means for locking said frame in rigid relation with said main base, and hydraulic means for operating said locking means to provide for release of said locking means during operation of said drive means.

3. An adjustable scrap cutter for use in a slitting line for sheet stock including a main base and slitting means for continuously trimming scrap strips from the side edges of the stock, comprising a frame, means supporting said frame in movable relation with said base transversely of said line, rotary means carried by said frame for cutting said scrap strips into relatively short pieces, means on said frame for guiding said scrap strips to said cutting means, said cutting means including a pair of complementary shearing blades having cutting edges extending transversely of said slitting line at all times and being of substantially greater effective length than the widths of said scrap strips to provide for cutting said scrap strips at a multiplicity of positions along said cutting means, means under the control of the operator for moving said frame with respect to said base to change the location along said cutting means at which said scrap strips are cut, releasable means under the control of the operator for locking said frame in rigid relation with said main base, and means forming quickly adjustable connections between said guide means and said frame to provide for shifting the positions of said guide means in accordance with the relative positions of said cutting means and said scrap strips.

4. An adjustable scrap cutter for use in a slitting line for sheet stock including a main base and slitting means for continuously trimming scrap strips from the side edges of the stock, comprising a frame, means supporting said frame in movable relation with said base transversely of said line, rotary means carried by said frame for cutting said scrap strips into relatively short pieces, guides for directing said scrap strips to said cutting means, guide fingers for directing the good stock across said frame and away from said cutting means, said cutting means including a pair of complementary shearing blades having cutting edges extending transversely of said slitting line at all times and being of substantially greater effective length than the widths of said scrap strips to provide for cutting said scrap strips at a multiplicity of positions along said cutting means, means under the control of the operator for moving said frame with respect to said base to change the location along said cutting means at which said scrap strips are cut, releasable means under the control of the operator for locking said frame in rigid relation with said main base, said frame having a plurality of grooves extending thereacross above said cutting means, and means cooperating with said grooves and movable slidably therein for supporting said guides and said guide fingers for rapid adjustment transversely of said line in accordance with the moved position of said frame with respect to said line.

5. An adjustable scrap cutter for use in a slitting line for sheet stock including a main base and slitting means for continuously trimming scrap strips from the side edges of the stock, comprising a frame including a dovetailed lower portion depending therefrom, means on said base forming a guiding and supporting structure complementary to said dovetailed frame portion to provide for movement of said frame on said base transversely of said line, means carried by said frame for cutting said scrap strips into relatively short pieces, means for guiding said scrap strips to said cutting means, said cutting means including a pair of complementary shearing blades having cutting edges extending transversely of said slitting line at all times and being of substantially greater effective length than the widths of said scrap strips to provide for cutting said scrap strips at a multiplicity of positions along said cutting means, a locking lug depending from said frame within said base and including an upwardly facing locking surface, locking means on said base including a movable locking portion overhanging said lug surface and movable into wedged locking relation therewith to secure said frame with respect to said base, means under the control of the operator for operating said locking means to lock and release said frame, and additional means under the control of the operator for moving said frame with respect to said base upon release of said locking means to change the location along said cutting means at which said scrap strips are cut.

References Cited in the file of this patent

UNITED STATES PATENTS

| | | |
|---|---|---|
| 438,845 | Hine | Oct. 21, 1890 |
| 1,797,950 | Forman | Mar. 24, 1931 |
| 2,014,248 | Evans | Sept. 10, 1935 |
| 2,214,160 | Carr | Sept. 10, 1940 |
| 2,242,887 | Holdgate et al. | May 20, 1941 |
| 2,636,579 | De Haas | Apr. 28, 1953 |